(12) United States Patent
Engelmann et al.

(10) Patent No.: US 7,582,037 B2
(45) Date of Patent: Sep. 1, 2009

(54) COMPACT DIFFERENTIAL ASSEMBLY

(75) Inventors: Michael Engelmann, Berlin (DE); Werner Krude, Neunkirchen-Seelscheid (DE); Heinzwilli Fuchs, Mühleip (DE)

(73) Assignee: GKN Driveline International, GmbH, Lohmar (DE)

( * ) Notice: Subject to any disclaimer, the term of this patent is extended or adjusted under 35 U.S.C. 154(b) by 442 days.

(21) Appl. No.: 10/585,218

(22) PCT Filed: Jan. 2, 2004

(86) PCT No.: PCT/EP2004/000002

§ 371 (c)(1),
(2), (4) Date: Sep. 18, 2006

(87) PCT Pub. No.: WO2005/066520

PCT Pub. Date: Jul. 21, 2005

(65) Prior Publication Data

US 2007/0173335 A1    Jul. 26, 2007

(51) Int. Cl.
*F16H 48/08* (2006.01)
(52) U.S. Cl. .................. 475/227; 475/230; 475/248
(58) Field of Classification Search ............. 475/225, 475/227, 230–248
See application file for complete search history.

(56) References Cited

U.S. PATENT DOCUMENTS

| 2,219,025 A | | 10/1940 | Vanderberg | |
|---|---|---|---|---|
| 2,270,567 A | | 1/1942 | Slider | |
| 2,716,461 A | | 8/1955 | MacPherson | |
| 3,974,717 A | * | 8/1976 | Breed et al. | 475/86 |
| 4,597,312 A | * | 7/1986 | Hicks et al. | 475/204 |
| 4,733,578 A | * | 3/1988 | Glaze et al. | 475/246 |
| 5,286,239 A | * | 2/1994 | Ito et al. | 475/231 |
| 6,705,965 B2 | * | 3/2004 | Sullivan | 475/230 |

FOREIGN PATENT DOCUMENTS

| DE | 43 41 728 | 6/1994 |
|---|---|---|
| DE | 43 43 109 | 6/1995 |
| DE | 103 54 999 | 4/2005 |
| DE | 103 54 998 | 5/2005 |
| DE | 103 52 904 | 6/2005 |
| EP | 614778 | 9/1994 |
| FR | 2547883 A1 * | 12/1984 |

* cited by examiner

*Primary Examiner*—Ha D. Ho
(74) *Attorney, Agent, or Firm*—Rader, Fishman & Grauer, PLLC

(57) ABSTRACT

A differential assembly (11) for being rotatably supported around a longitudinal axis (A) and for being rotatingly driven inside a housing, comprising a differential carrier (12) which comprises a base (13) at its first end and an aperture (14) at its second end; two sideshaft gears (21, 23) arranged coaxially relative to the longitudinal axis (A), as well as a plurality of a differential gears (25, 26, 27) in the differential carrier, each engaging the two sideshaft gears; an outer bearing seat (15) at the first end of the differential carrier (12) for sliding on a first rolling contact bearing (16) and an inner bearing seat (17) at the second end of the differential carrier (12) for inserting a second rolling contact bearing (18).

11 Claims, 4 Drawing Sheets

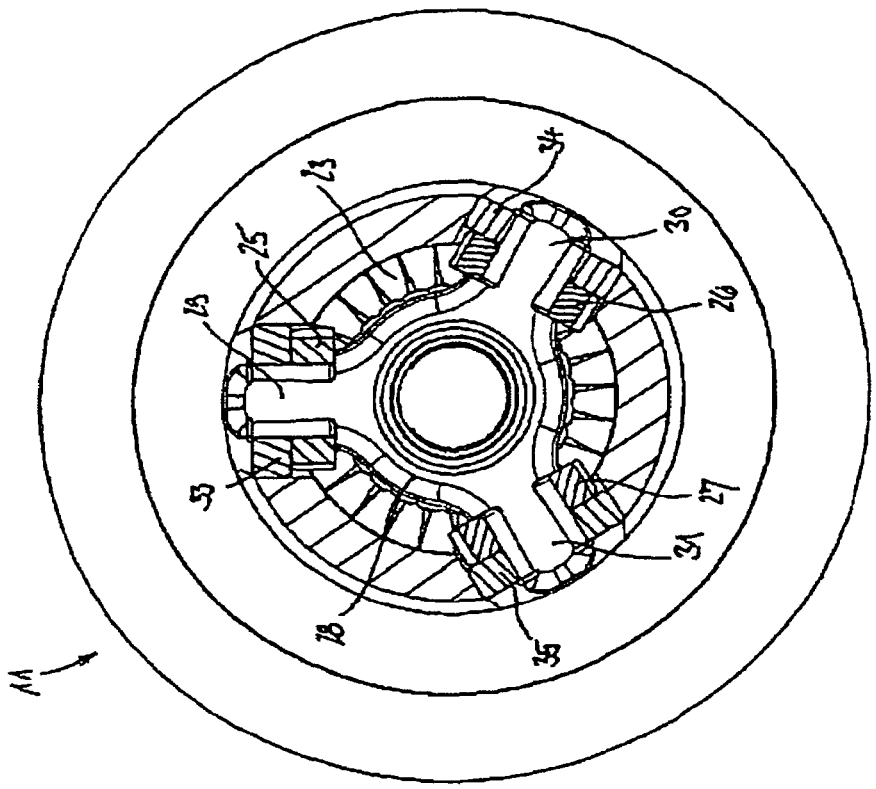
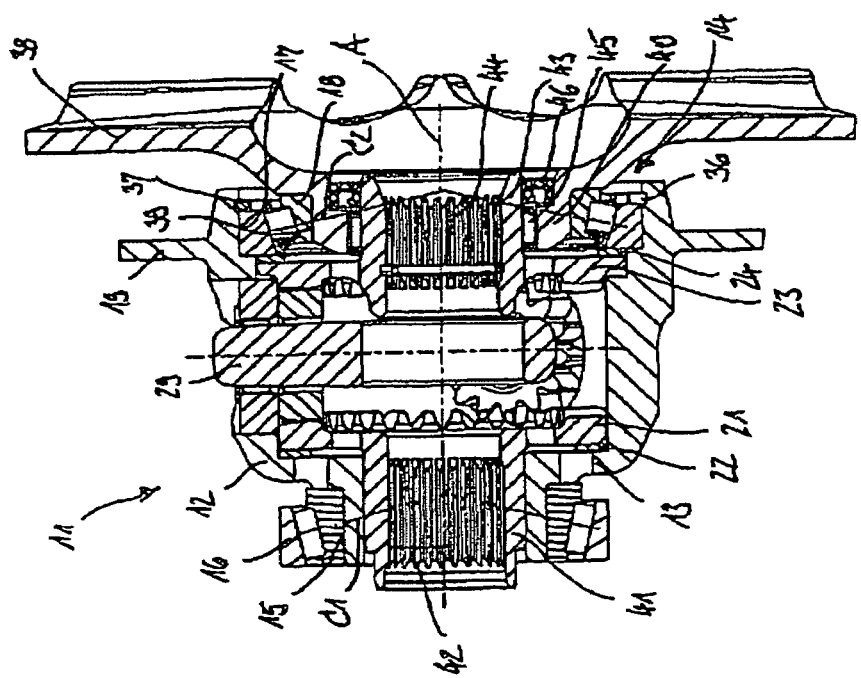
Fig. 1B
Fig. 1A

COMPACT DIFFERENTIAL ASSEMBLY

TECHNICAL FIELD

The invention relates to a differential assembly for being rotatably supported around a longitudinal axis A and for being rotatingly driven inside a housing, comprising a differential carrier which comprises a base at its first end and an aperture at its second end, the differential assembly further comprising two sideshaft gears arranged coaxially relative to the longitudinal axis A, and a plurality of differential gears in the differential carrier, each engaging the two sideshaft gears.

BACKGROUND

Differential assemblies are frequently used in axle housings of driving axles of motor vehicles for the purpose of driving the driving wheels of the driving axle via sideshaft gears and driveshafts and, at the same time, for permitting speed differentials between the driving wheels. It is advantageous for the differential assemblies to be axially as compact and short as possible, so that the driveshafts being connected to the driving wheels can be as long as possible. The longer the driveshafts, the smaller the required articulation angles of the constant velocity joints when the motor vehicle is in operation.

Axially compact differentials for the above-mentioned application are known from the earlier applications 103 54 999.4, 103 54 998.6 and 103 52 904.7 submitted by the applicant.

SUMMARY OF THE INVENTION

The present invention provides novel differential assemblies which are also compact and which also comprise a great potential for making savings in respect of axial length. The invention provides a differential assembly for being rotatably supported around a longitudinal axis A and for being rotatingly driven inside a housing, comprising a differential carrier which comprises a base at its first end and an aperture at its second end; two sideshaft gears arranged coaxially relative to the longitudinal axis A, and a plurality of differential gears in the differential carrier, each engaging the two sideshaft gears; an outer bearing seat at the first end of the differential carrier for sliding on a first rolling contact bearing and an inner bearing seat at the second end of the differential carrier for inserting a second rolling contact bearing.

The inventive type of bearing as proposed here results in an axially short design in that there is no need for a special projection to be provided at the differential carrier for the second bearing seat, but that said bearing seat is provided in the form of an inner bearing face directly in the differential carrier. In consequence, it becomes possible to eliminate a differential carrier cover in the conventional sense, which cover is arranged opposite the base, and to axially assemble the sideshaft gears and the differential gears in the differential carrier entirely by using a simple securing mechanism. The axial securing mechanism can act directly on the sideshaft gear at the aperture end in that the second bearing adjoins the sideshaft gear on the outside and in that the securing mechanism acts directly on the bearing. According to a supplementary embodiment, it is possible for abutment discs and/or supporting discs to be inserted between the sideshaft gear and the outer bearing race of the second bearing. The outer diameter of the abutment discs can correspond to that of the sideshaft gears. The supporting disc, while having the same outer diameter as the second bearing, can be inserted into the outer bearing seat. In an advantageous embodiment, the differential carrier can have a stepped inner diameter and can be axially undercut-free.

To reduce the axial length further, the sideshaft gears are provided in the form of crown gears and the differential gears are provided in the form of spur gears.

According to preferred assembly method, the first rolling contact bearing can be supported in a first housing part and the second rolling contact bearing can be supported on a second housing part, more particularly, it can be bolted to a cover part which can be clamped to the first housing part.

Furthermore, according to another embodiment, the first sideshaft gear is supported in the differential carrier, whereas the second sideshaft gear is supported in a part of the housing, more particularly, said cover part.

The sideshaft gears and the differential gears can be axially supported on the base of the differential carrier and can be axially secured by the above-mentioned securing mechanism inserted into the aperture of the differential carrier, more particularly, by a simple securing ring.

The operation of mounting the differential assembly in the axle housing takes place in such a way that first the assembly with the first bearing mechanism is inserted into the housing and then the cover part is inserted while mounting the second bearing mechanism to the first housing part. The rolling contact bearings, while being adapted to the above mounting sequence, comprise effective lines which, together with the longitudinal axis A, form angles which open in the same direction, i.e. are positioned approximately parallel relative to one another, with the cone points of all the effective lines all pointing to the aperture of the differential carrier. At the sideshaft gears there can be provided attaching sleeves with inner shaft teeth into which there can be directly inserted shaft journals of constant velocity joints to provide a rotationally fast connection. The present invention provides an axially short differential with an extremely small number of parts. The second rolling contact bearing can have a greater diameter than the first rolling contact bearing. As a result of the proposed bearing assembly with effective lines extending parallel relative to one another, the supporting length of the bearing relative to a bearing with a conventional so-called X-assembly of the effective lines is increased. The pretension of the bearing assembly is achieved by mounting the cover part to the first housing part.

A cover in the conventional sense which closes the differential carrier and is connected thereto is eliminated so that axial mounting length can be saved. The differential carrier is compact and easy to produce.

BRIEF DESCRIPTION OF THE DRAWING

Preferred embodiments of the invention will be described below with reference to the drawings wherein FIG. 1 shows an inventive differential assembly with a housing cover in a first embodiment:

A) in a longitudinal section; and

B) in a cross section.

Figure 2:
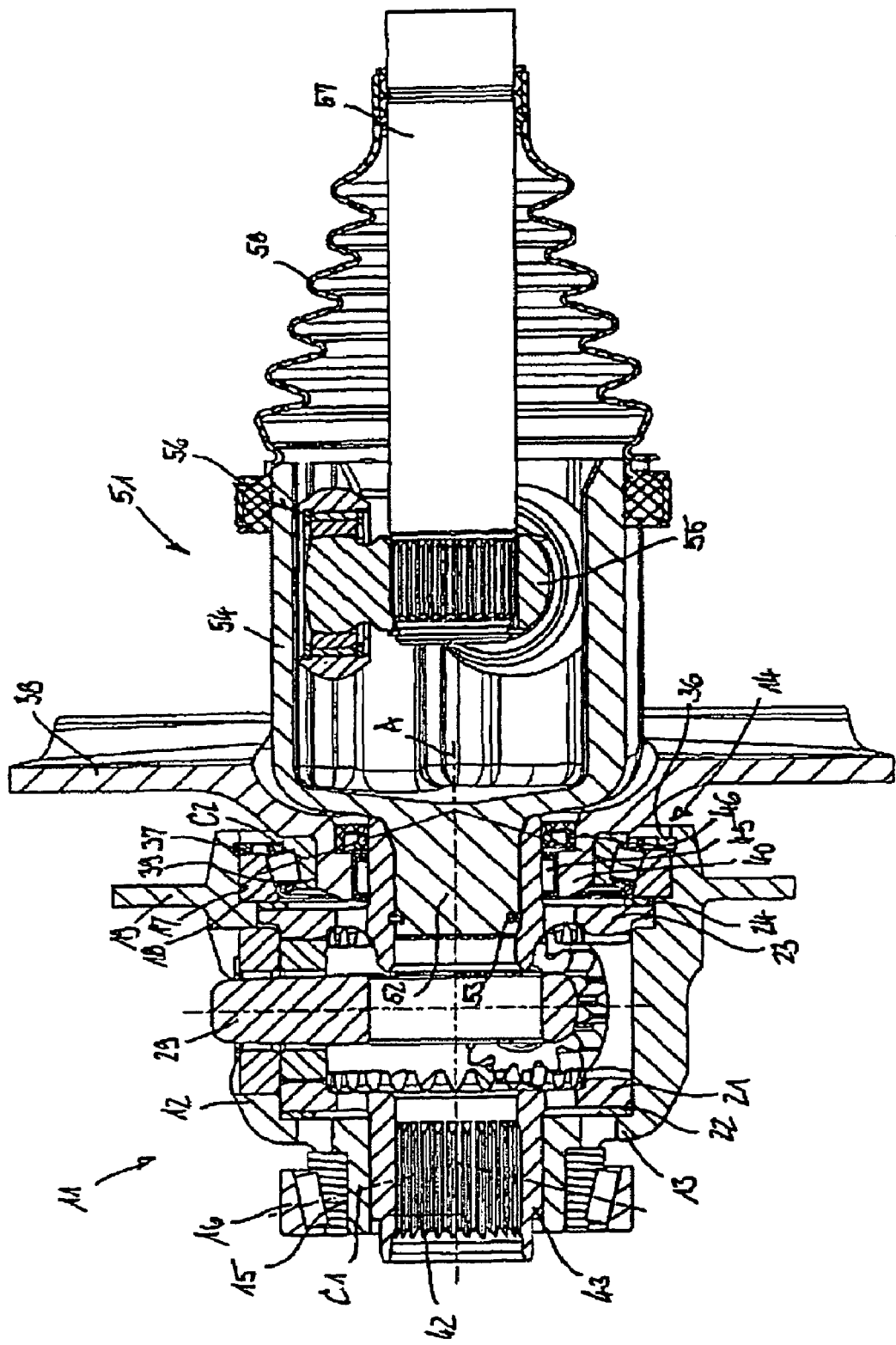

FIG. 2 shows a differential assembly according to FIG. 1 with a supplementary tripode joint in a longitudinal section.

Figure 3B:
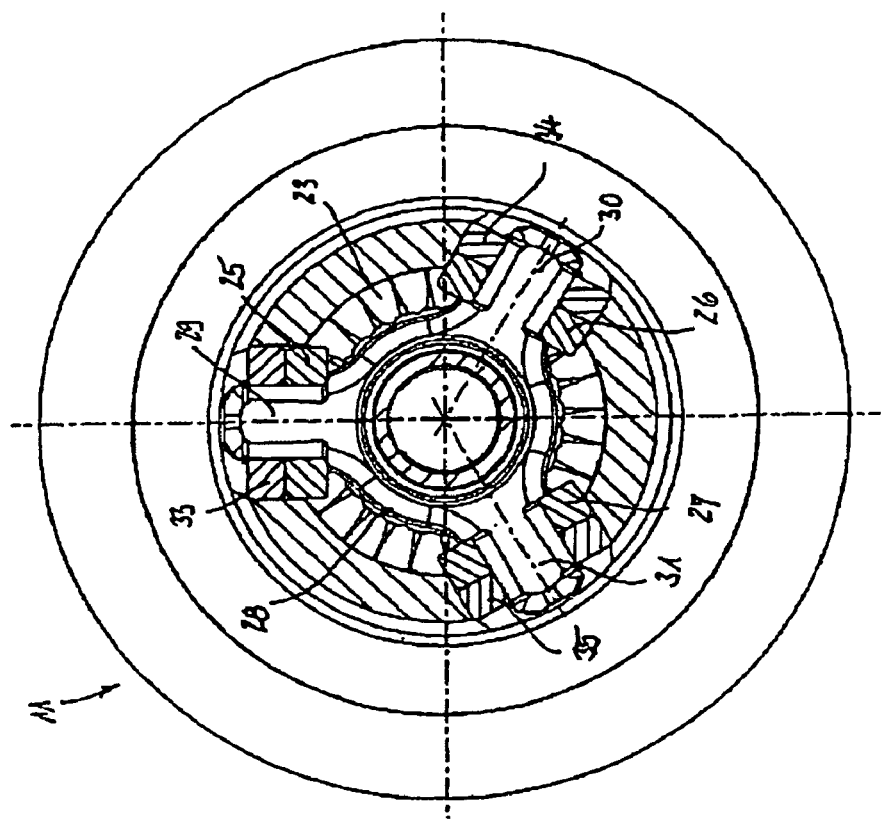
Figure 3A:
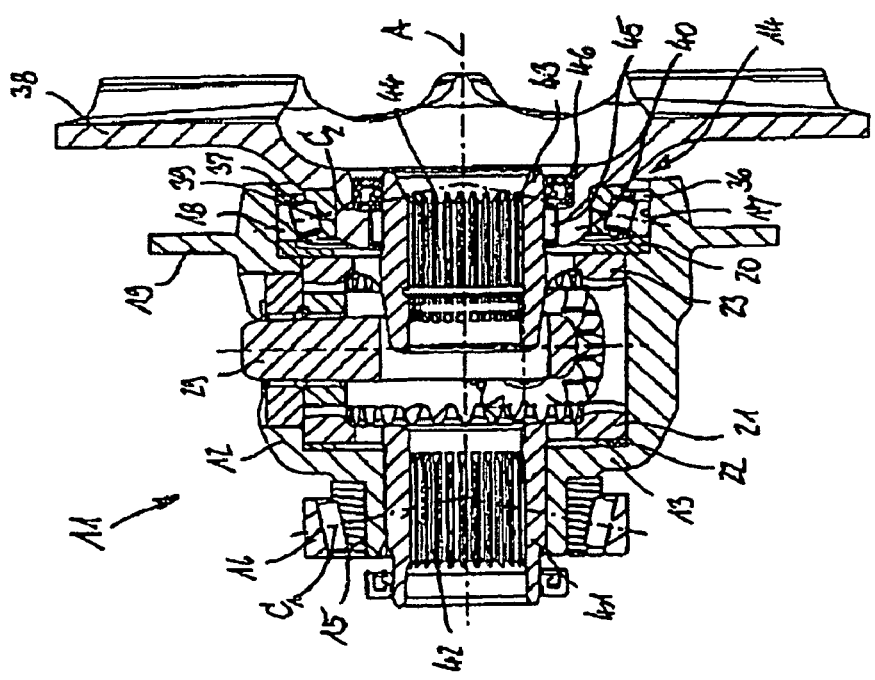

FIG. 3 shows an inventive differential assembly with a housing cover in a second embodiment:

A) in a longitudinal section; and

B) in a cross section.

Figure 4:
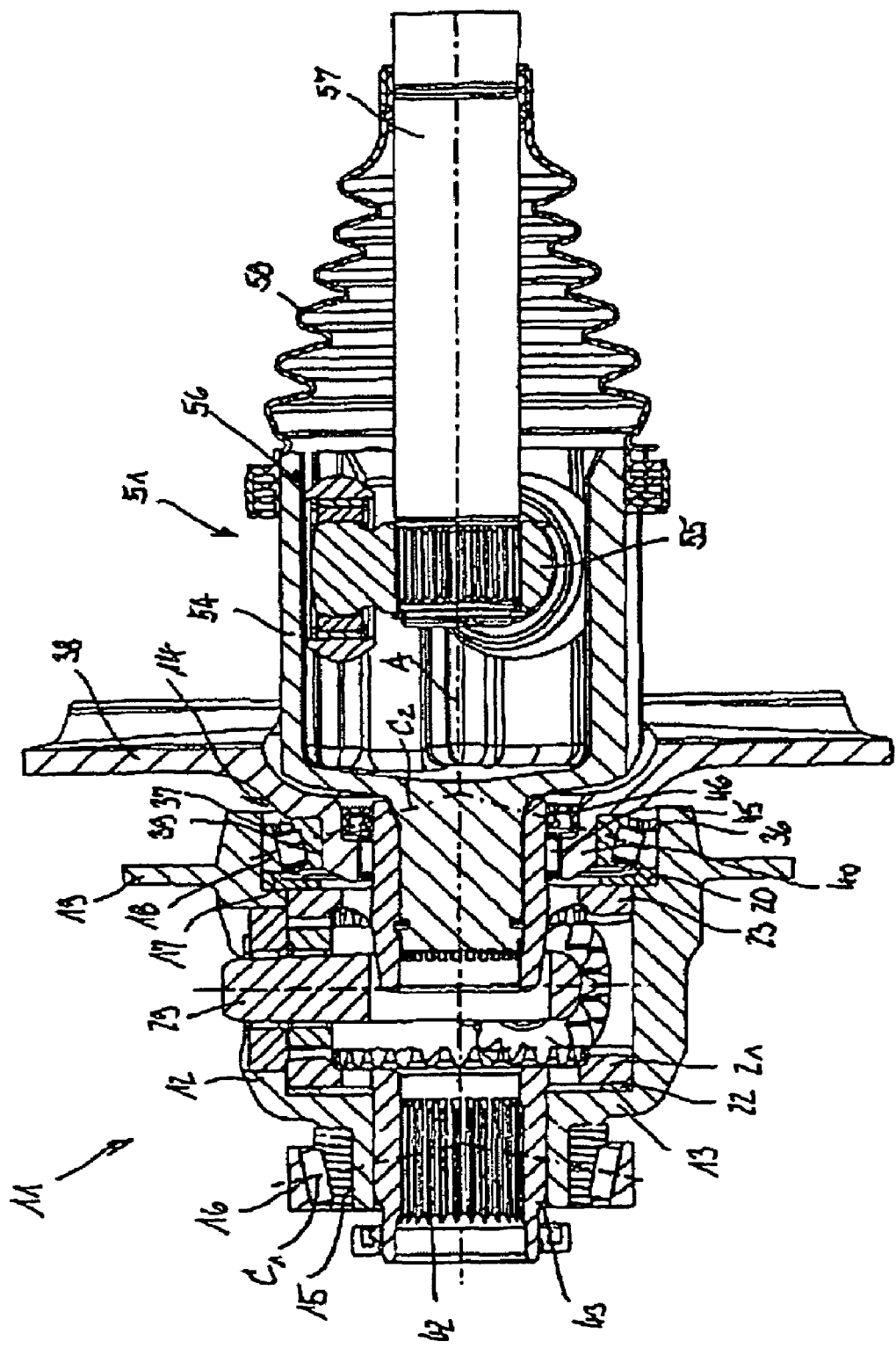

FIG. 4 shows a differential assembly according to FIG. 3 with a supplementary tripode joint in a longitudinal section.

DETAILED DESCRIPTION

FIGS. 1 and 3 will be described jointly below. They each show an inventive differential assembly 11 with a longitudinal axis A. The differential assembly 11 comprises a differential carrier 12 with a base 13 at its first end and an aperture 14 at its second end. At the first end, there is formed an outer bearing seat 15 on to which there is slipped a first rolling contact bearing 16 in the form of an angular roller bearing. At its second end, the differential carrier 12 comprises an inner bearing seat 17 into which there is inserted a second rolling contact bearing 18, again in the form of an angular roller bearing. The effective lines C1, C2 of the rolling contact bearings extend in the same direction with reference to the longitudinal axis A, i.e. the effective lines effectively extend parallel relative to one another and, by means of their cone points, point towards the aperture end. A first sideshaft gear 21 supported via an abutment disc 22 on the base 13 and a second sideshaft gear 23 supported directly on the second rolling contact bearing 18 are inserted into the differential carrier. In FIG. 1, an abutment disc 24 has the same outer diameter as the sideshaft gear 23, as a result of which the outer bearing race of the second rolling contact bearing 18 axially rests against a housing face. In FIG. 3, a supporting disc 20 has the same outer diameter as the second rolling contact bearing 18, as a result of which the outer bearing race of same axially rests against the larger annular face of the supporting disc 20. In the region of the second rolling contact bearing 18, a flange 19 has been formed on to the differential carrier 12, and a driving ring gear can be fixed to said flange 19. The sideshaft gears 21, 23 have each been provided in the form of crown gears and engage the differential gears 25, 26, 27 which are supported on a cross member 28 with radial arms 29, 30, 31. The cross member is secured by annular covers 33, 34, 35 in the differential carrier. The assembly consisting of sideshaft gears 21, 23, abutment discs 22, 24 and differential gears 25, 26, 27 is axially secured only by a securing ring 37 which is inserted into an inner groove 36 and which is introduced into the aperture 14 of the differential carrier. The differential carrier 12 can be supported via the first rolling contact bearing 16 in a housing part (not illustrated), whereas it is supported via the second rolling contact bearing 18 in a cover part 38 which can be inserted into the above-mentioned housing part, more particularly, it is bolted thereto. At the cover 38 there is provided a bearing projection 40 with an outer bearing seat 39 which receives the inner race of the second rolling contact bearing 18. The sideshaft gear 31 is directly supported via a connecting sleeve 41 in one part of the differential carrier. Said connecting sleeve 41 is provided with inner shaft teeth 42 for inserting a sideshaft. The sideshaft gear 23 also comprises a connecting sleeve 43 which can be seen to be provided with inner shaft teeth 44 for inserting a sideshaft. The connecting sleeve 43 is supported via a needle bearing 45 in the bearing projection 40 of the cover 38. Furthermore, for sealing the differential carrier there is provided a seal 46. In the differential carrier shown here, a cover, which is otherwise used, in respect of its axial securing function, is replaced by the securing ring 37, whereas, in respect of its sealing function, the otherwise commonly used cover is replaced by the housing cover 38. The differential assembly is extremely short, more particularly as a result of the use of crown gears as sideshaft gears. If viewed from the aperture 14, the differential carrier, on its inside, is axially undercut-free, so that it is easy to produce. At the same time, as a result of this design, the second rolling contact bearing 18 has to have a greater diameter than the first rolling contact bearing 16.

The differential carrier 12 itself is mounted in such a way that first the sideshaft gear 21 is introduced together with the abutment disc 22 and then the cross member 28 is inserted through the aperture 14. The differential gears 25, 26, 27 are thereafter positioned from the outside on to said cross member and then secured by the annular covers 33, 34, 35. Finally, the sideshaft gear 23, together with the abutment disc 24 or the supporting disc 20 as well as the outer bearing race of the second rolling contact bearing 18 are built in. Thereafter, the securing ring 37 is used for securing purposes. Said assembly, in its entirety, is mounted from left to right, with, first, the differential carrier, via the first rolling contact bearing 16, being inserted into the housing (not shown) and then, the cover 28, together with the inner bearing race and the rollers of the second rolling contact bearing 18 is introduced into the already assembled outer bearing race of the second rolling contact bearing 18.

FIGS. 2 and 4 will be described jointly below, and any details corresponding to those shown in FIGS. 1 and 3 have been given the same reference numbers. To that extent, reference is made to the preceding description. Into the shaft teeth of the attaching sleeve of the second sideshaft gear 23, there has been inserted a joint journal 52 of a tripode joint 51, which joint journal 52 is secured by a securing ring 53 in the attaching sleeve. A joint tulip 54, a cross member 55 with a roller assembly 56 as well as a shaft 57 inserted into said cross member 55 can be seen at the tripode joint 51. The joint tulip 54 is sealed relative to the shaft 57 by a convoluted boot 58.

LIST OF REFERENCE NUMBERS 11 differential assembly
12 differential carrier
13 base
14 aperture
15 bearing seat
16 rolling contact bearing
17 bearing seat
18 rolling contact bearing
19 flange
20 supporting disc
21 sideshaft gear
22 abutment disc
23 sideshaft gear
24 abutment disc
25 differential gear
26 differential gear
27 differential gear
28 cross member
29 arm
30 arm
31 arm
32 - - -
33 annular cover
34 annular cover
35 annular cover
36 inner groove
37 securing ring
38 cover
39 bearing seat
40 bearing projection
41 attaching sleeve
42 shaft toothing
43 attaching sleeve
44 shaft teeth
45 needle bearing
46 shaft seal 51 tripode joint
52 joint journal
53 securing ring
54 joint tulip
55 cross member
56 roller assembly
57 shaft
58 convoluted boot

The invention claimed is:

1. A differential assembly for being rotatably supported around a longitudinal axis (A) and for being rotatingly driven inside a housing, comprising:
   a differential carrier which comprises a base at a first end and an aperture at a second end;
   two sideshaft gears arranged coaxially relative to the longitudinal axis (A), and a plurality of differential gears in the differential carrier, each engaging the two sideshaft gears;
   an outer bearing seat at the first end of the differential carrier on which the outer bearing seat a first rolling contact bearing is supported and an inner bearing seat at the second end of the differential carrier in which the inner seat a second rolling contact bearing is supported;
   wherein a first one of the two sideshaft gears is axially supported on the base of the differential carrier and wherein a second one of the two sideshaft gears is axially supported on an outer bearing race of the second rolling contact bearing; and
   wherein the second one of the two sideshafts is supported by the outer bearing race either directly.

2. An assembly according to claim 1, wherein the first rolling contact bearing can be supported in a first housing part and the second rolling contact bearing can be supported on as second housing part.

3. An assembly according to claim 1, wherein the first sideshaft gear is supported in the differential carrier and the second sideshaft gear is supported in a housing cover.

4. An assembly according to claim 1, wherein the sideshaft gears and the differential gears are axially supported on the base of the differential carrier and are axially secured by a securing mechanism inserted into the aperture of the differential carrier.

5. An assembly according to claim 4, wherein the securing mechanism has an axial supporting effect on the second rolling contact bearing which supports the second sideshaft gear at the aperture end either directly or indirectly.

6. An assembly according to claim 4 comprising an abutment disc or a supporting disc inserted between the outer bearing race of the second rolling contact bearing and the sideshaft gear at the aperture end.

7. An assembly according to claim 1, wherein the sideshaft gears are crown gears and the differential gears are spur gears.

8. An assembly according to claim 4, wherein the securing mechanism is a securing ring inserted into an inner groove.

9. An assembly according to claim 1, wherein the rolling contact bearings comprise effective lines which form angles with the longitudinal axis (A) opening in the same direction, wherein cone points of the effective lines point towards the aperture of the differential carrier.

10. An assembly according to claim 1, wherein the second rolling contact bearing comprises a greater diameter than the first rolling contact bearing.

11. An assembly according to claim 5 comprising an abutment disc or a supporting disc inserted between the outer bearing race of the second rolling contact bearing and the sideshaft gear at the aperture end.

\* \* \* \* \*

UNITED STATES PATENT AND TRADEMARK OFFICE
CERTIFICATE OF CORRECTION

PATENT NO. : 7,582,037 B2  Page 1 of 1
APPLICATION NO. : 10/585218
DATED : September 1, 2009
INVENTOR(S) : Michael Engelmann et al.

It is certified that error appears in the above-identified patent and that said Letters Patent is hereby corrected as shown below:

Claim 1: line 21, please add the following after "directly" or indirectly.

Claim 2: line 3, change [[as]] to a.

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,582,037 B2 | |
| APPLICATION NO. | : 10/585218 | |
| DATED | : September 1, 2009 | |
| INVENTOR(S) | : Michael Engelmann et al. | |

It is certified that error appears in the above-identified patent and that said Letters Patent is hereby corrected as shown below:

Column 5, Claim 1: line 30, please add the following after "directly" or indirectly.

Column 5, Claim 2: line 33, change [[as]] to a.

This certificate supersedes the Certificate of Correction issued November 3, 2009.

Signed and Sealed this

Twenty-fourth Day of November, 2009

David J. Kappos
*Director of the United States Patent and Trademark Office*